United States Patent [19]
Landry

[11] 3,864,587
[45] Feb. 4, 1975

[54] MAGNETIC TRANSMISSION

[76] Inventor: Alfred Landry, 7589 Calvocado St., Lemon Grove, Calif. 92045

[22] Filed: Aug. 23, 1972

[21] Appl. No.: 283,077

[52] U.S. Cl. ............................. 310/103, 74/DIG. 4
[51] Int. Cl. ........................................... H02k 49/06
[58] Field of Search ......... 310/96, 98, 99, 101, 105, 310/103; 74/DIG. 4

[56] References Cited
UNITED STATES PATENTS
| | | | |
|---|---|---|---|
| 3,378,710 | 4/1968 | Martin, Jr. | 310/101 X |
| 3,523,204 | 8/1970 | Rand | 310/103 X |

FOREIGN PATENTS OR APPLICATIONS
| | | | |
|---|---|---|---|
| 147,323 | 10/1954 | Sweden | 310/103 |

Primary Examiner—J. D. Miller
Assistant Examiner—Harry E. Moose, Jr.
Attorney, Agent, or Firm—Markav & Smith

[57] ABSTRACT

The magnetic turbine of the present invention has an armature mounted to rotate about an axis of rotation. Each of a plurality of permanent magnets carried by the armature are magnetically oriented with each adjacent magnet having opposite magnetic polarities. Each of a plurality of drive rotor permanent magnets is rotatably mounted at a fixed radial position with respect to the armature axis of rotation and is disposed in magnetic proximity with respect to the permanent magnets carried by the armature. A means is provided for driving all of the drive rotor permanent magnets at a common speed and in a common direction. Each of the drive rotor permanent magnets is magnetically oriented for rotating the armature at a speed that is proportional to the rotating speed of the drive rotor permanent magnets. The rotation of the drive rotor magnets pulls the armature magnets in a direction opposite thereto after an initial magnetically locked condition is overcome by an input drive means.

8 Claims, 6 Drawing Figures

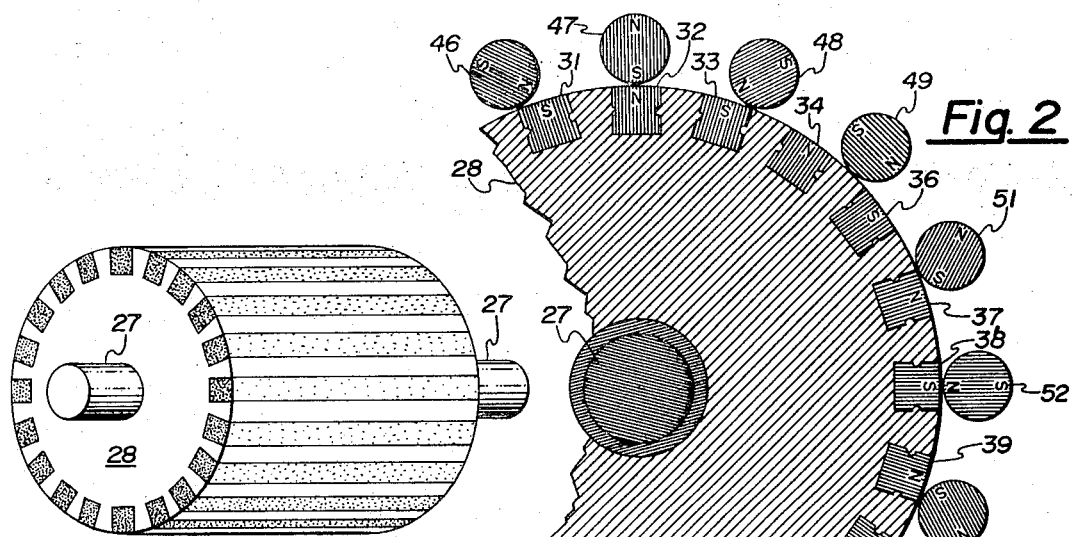
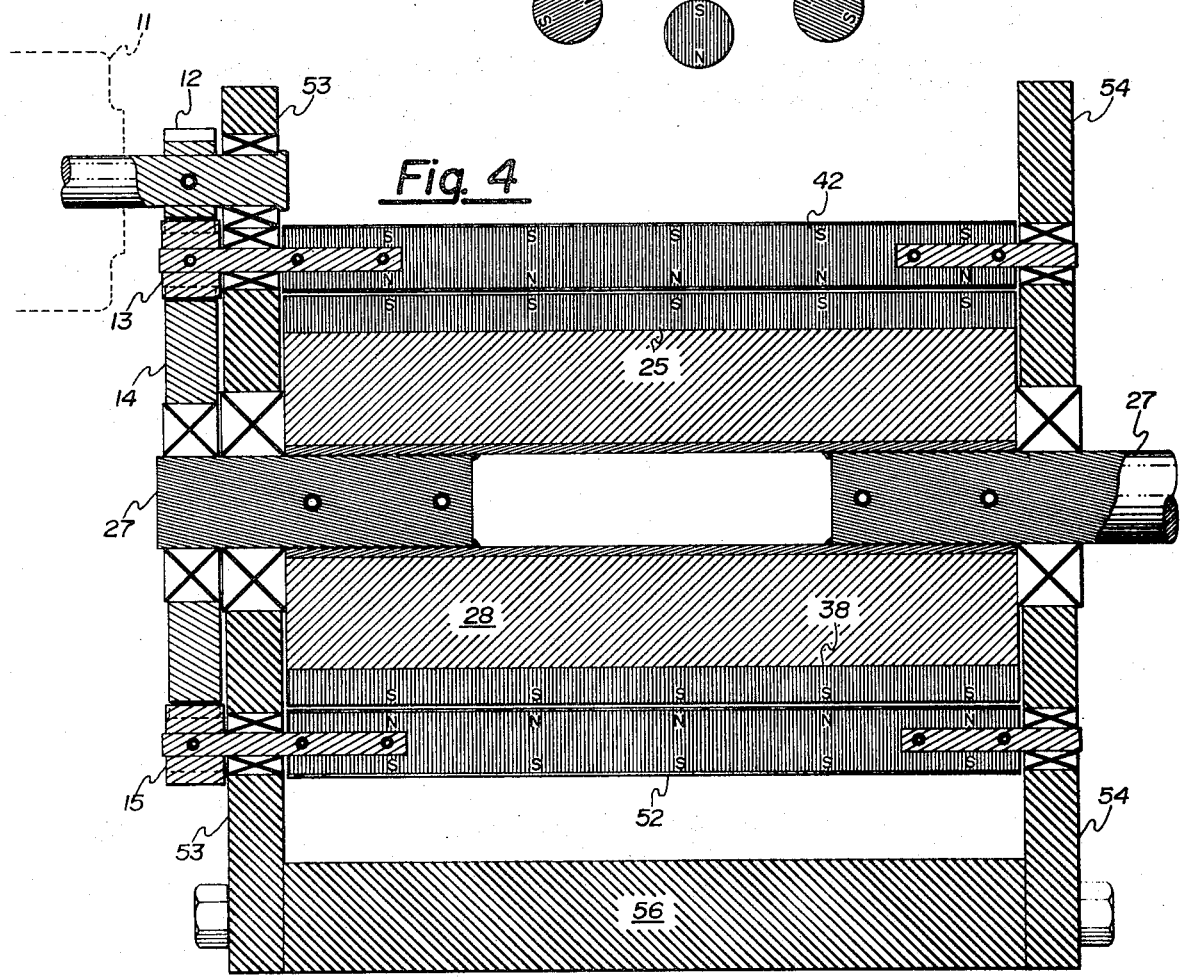

PATENTED FEB 4 1975 3,864,587

MAGNETIC TRANSMISSION

BRIEF DESCRIPTION OF THE INVENTION

The present invention relates to a magnetic turbine or transmission, and more particularly to a magnetic turbine utilizing a plurality of driven magnetic rotors for rotating a magnetic armature mounted coaxially therewith. The terms "turbine" and "transmission" are considered equivalents throughout the specification.

According to the invention, a magnetic turbine is provided having an armature that is coupled to an output shaft and carries a plurality of permanent magnets such as ceramic magnets which can be segmented or integral. A plurality of drive rotor permanent magnets are mounted around the periphery of the armature magnets in magnetic proximity therewith. Each of the drive rotor magnets is rotatably mounted and geared to a main bull gear for rotating the drive rotor magnets in synchronous positions for magnetically rotating the armature via its permanent magnets thereon. An input and speed control motor can be coupled to the bull gear for rotating the drive rotor magnets and thereby the armature and output shaft. It has been found that if the 360° of the unit is divided into an even number of sectors, there must be an odd number of armature magnets and one less drive rotor magnet in each sector for proper polarization and synchronization. One example would be the case where each sector is a quadrant with five armature magnets and four drive rotor magnets therein.

PURPOSE OF THE INVENTION

An object of the present invention is the provision of an improved magnetic turbine.

Another object of the invention is the provision of a magnetic turbine having a positive speed control.

Yet another object of the invention is the provision of a magnetic turbine which is simple and inexpensive to manufacture and requires a minimum of maintenance.

BRIEF DESCRIPTION OF DRAWINGS

Other objects and many of the attendant advantages will be readily appreciated as the same becomes better understood by reference to the following detailed description when considered in connection with the accompanying drawing in which like reference numerals designate like parts throughout the Figs. thereof and wherein:

FIG. 2 is a fragmentary sectional view showing a schematic representation of magnet orientation in the turbine of FIG. 1, FIG. 3 is a perspective view of the armature of FIG. 1, FIG. 4 is a sectional view along line 4—4 of FIG. 1.

DESCRIPTION OF SPECIFIC EMBODIMENTS

Figure 1:
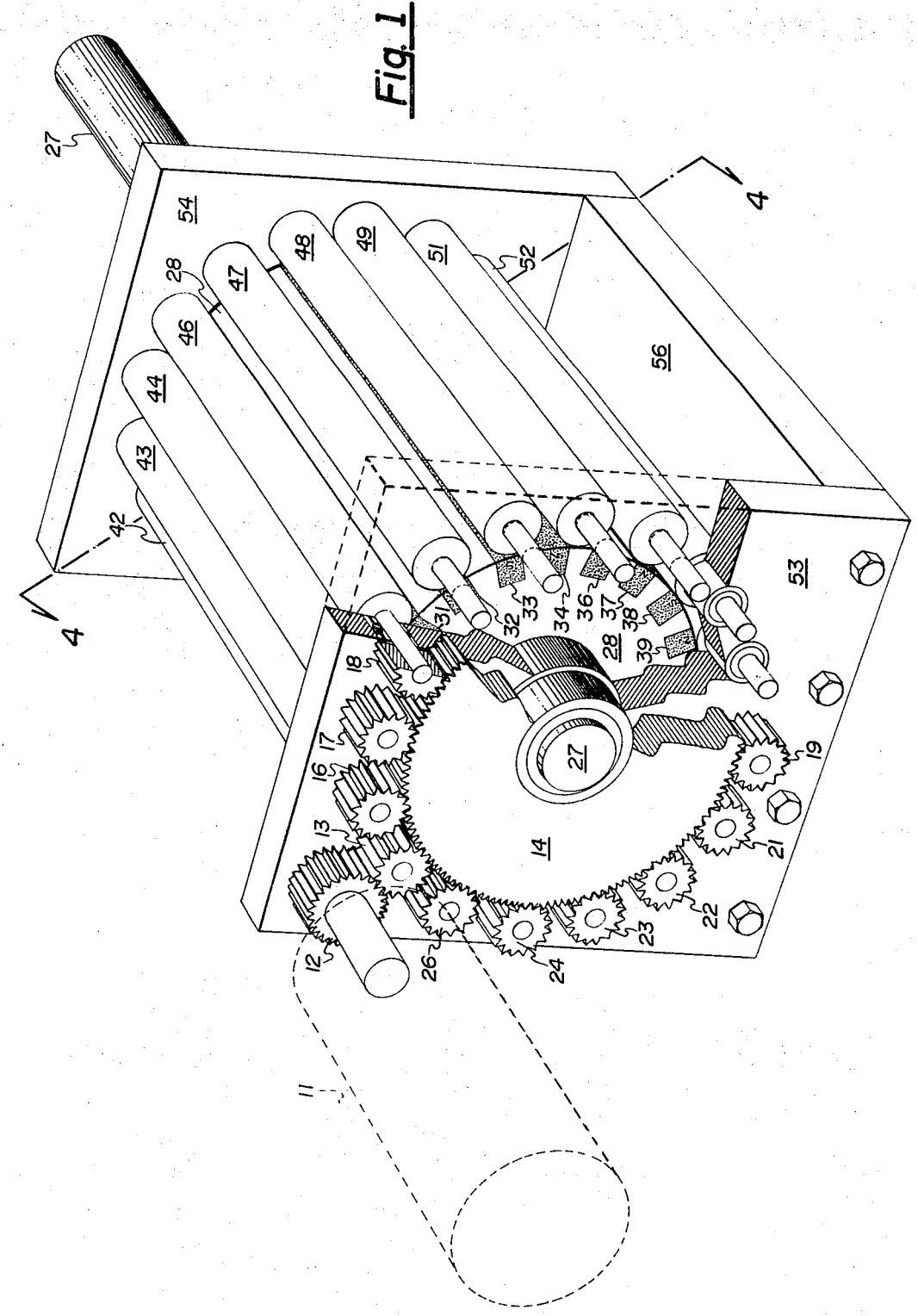
FIG. 1 is a fragmentary perspective view, partially sectioned, of a magnetic turbine made in accordance with this invention.

More specifically, referring to FIG. 1, input and speed control motor 11, shown in phantom, is coupled to drive gear 12 which in turn engages pinion gear 13. Pinion gear 13 engagingly drives bull gear 14 which in turn engagingly drives pinion gears 16, 17, 18, 19, 21, 22, 23, 24 and 26. Bull gear 14 is rotatably carried by output shaft 27. That is, bull gear 14 rotates independently from the rotation of shaft 27. Any known mechanism may be used to accomplish the desired result.

A non-magnetic armature 28 is fixedly mounted on output shaft 27 and carries permanent magnets 31, 32, 33, 34, 36, 37, 38 and 39 disposed circumferentially therearound along with the remaining armature magnets (not shown). As shown, the permanent magnets are isolated with respect to each other by non-magnetic material. Drive rotor magnets 42, 43, 44, 46, 47, 48, 49, 51 and 52 are rotatably mounted between vertical sections 53 and 54 that are bolted to base frame member 56. Drive rotors 42, 43, 44 and 46 carry pinion gears 13, 16, 17 and 18, respectively. As disclosed herein, each drive rotor is associated with and carries each of the pinion gears 13 and 16 through 26 as shown in FIG. 1. Consequently, when control motor 11 rotates drive gear 12, all of the drive rotors disposed a fixed radial distance with respect to the axis of rotation of armature 28 will rotate in the same direction.

Referring to FIG. 2, magnetic orientation of drive magnets 46, 47, 48, 49, 51 and 52 is shown with respect to armature magnets 31, 32, 33, 34, 36, 37, 38 and 39 carried by aluminum armature 28 which, in turn, is coupled to output shaft 27. As shown, the circumference of the armature 28 is divided into four equal quadrants constituting an even number of circumferential sectors. There are five armature magnets constituting an odd number thereof in each one of the sectors with one less drive rotor magnet than armature magnets in each sector. The armature 28 is shown in perspective in FIG. 3 carried by the output shaft 27. A plurality of permanent magnets carried around the periphery thereof constitutes the same magnet orientation as that shown in FIG. 2.

Referring to FIG. 4, input in drive motor 11 is coupled to drive gear 12 which, in turn, engages pinion gear 13. Bull gear 14 is engagingly driven by pinion gear 13. Gears 13 and 15 are carried by axles 40 and 45 which also carry drive rotors 42 and 52, respectively. Armature 28 is coupled to output shaft 27 and carries permanent magnets 25 and 38 in magnetic proximity to drive rotor magnets 42 and 52, respectively.

Figure 5:
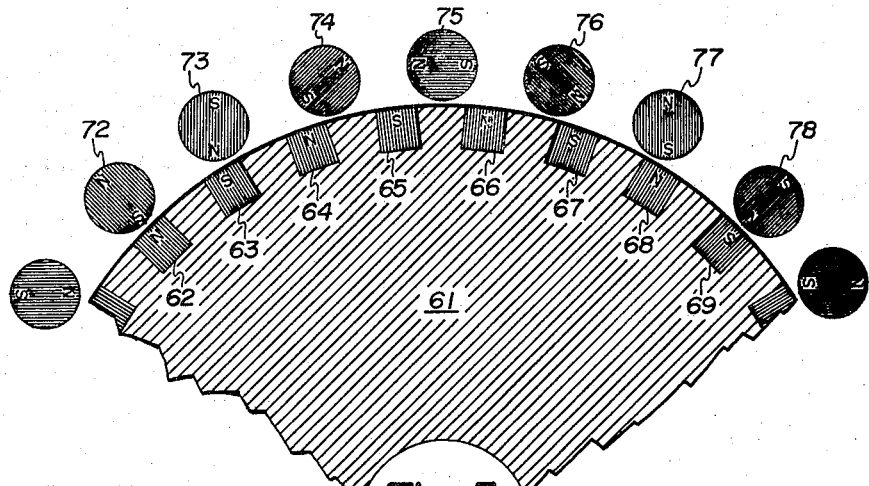
FIG. 5 is a cross-sectional view showing a schematic representation of another variation of magnet orientation.

Another variation of magnet orientation is shown in FIG. 5. The armature 61 has a plurality of permanent magnets 62 through 69 shown in magnetic proximity to drive rotors 72 through 78. The circumference of the armature 28 is divided into quadrants so that there are four circumferential sections. There are seven armature magnets associated with each quadrant. There are six drive rotor magnets associated with the armature magnets in this section as shown. That is, there is one less drive rotor magnet present in each sector than the number of armature magnets present in each sector.

Figure 6:
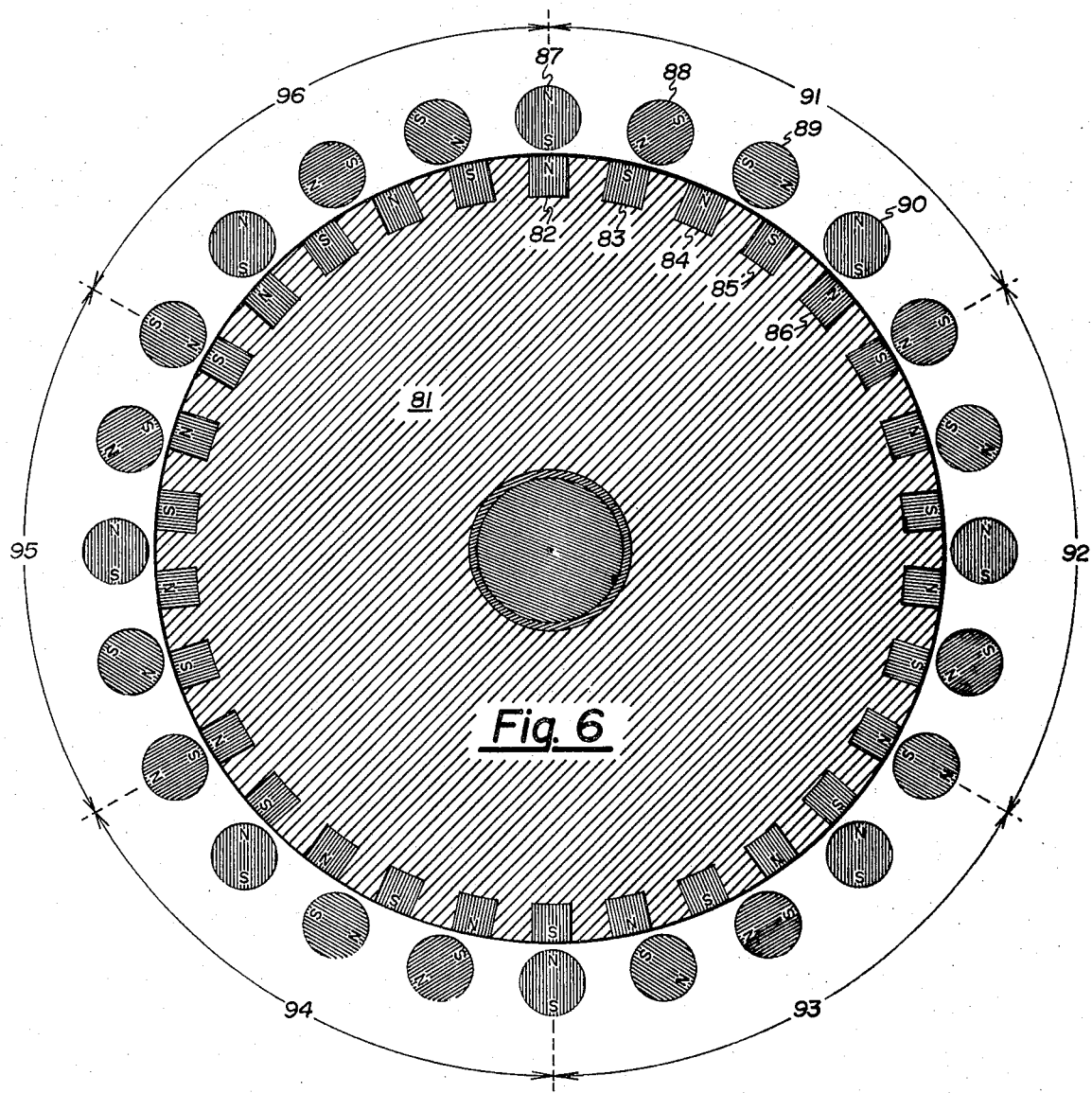
FIG. 6 is a cross-sectional view showing a schematic representation of a still further variation of magnet orientation on an armature useful in a magnetic turbine made in accordance with this invention.

A further variation of magnet orientation is shown in FIG. 6. The armature 81 carries a plurality of magnets 82 through 86 in the circumferential section 91. The drive rotor magnets 87 through 90 are in magnetic proximity to the magnets 82 through 86 in circumferential section 91. The remaining permanent magnets and drive rotor magnets associated with armature 81 fall in circumferential sections 92, 93, 94, 95 and 96.

OPERATION

Referring to FIG. 2, there are an even number of circumferential sections, i.e., four, an even number of drive rotor magnets in each circumferential section, i.e., four, and one more armature magnet than drive rotor magnet in each circumferential section. This relationship was found to be essential. In this embodiment there is one circumferential section in each quadrant of the armature. The number of circumferential sections must be even to ensure the correct polarity orientation of all the armature magnets. However, the number of circumferential sections need not be limited to four and therefore the armature is not necessarily divided into quadrants. The number of drive rotor magnets in each section must be even.

A typical magnet orientation is shown in FIG. 2 and quiescently will result in a magnetic locking of the armature 28 with respect to the drive rotor magnets when the drive rotor magnets are not driven or rotated. This is evident from the polar orientation as illustrated. That is, the first rotor magnets 47 and 52 in each of the adjacent circumferential sections shown have magnetic poles contacting opposite magnetic poles on the permanent magnets 32 and 38, respectively.

In operation, input and speed control motor 11 is rotated thereby driving drive gear 12. Consequently, pinion gear 13 is rotated thereby driving bull gear 14 which, in turn, drives all of the pinion gears 16, 17, 18, 19, 21, 22, 23, 24 and 26 as illustrated. Each of the pinion gears is coupled to a separate drive rotor magnet for rotating the drive rotor magnets in a counterclockwise direction indicated by arrow A shown in FIG. 2. As the drive rotor magnets are rotated counterclockwise, they will pull armature 28 via the permanent magnets mounted along the periphery of armature 28 in a clockwise direction as shown and indicated by arrow B. That is, the armature 28 will rotate in a direction opposite to the direction of rotation of all the drive rotor magnets.

The next adjacent circumferential quadrant section in the magnet orientation of FIG. 2 has the opposite polarization as illustrated. That is, each adjacent circumferential section will have opposite polarization in the magnet orientations associated with the invention. The net result is a completely symmetric view going around the periphery of the armature 28. Hence, if the drive rotor magnets are rotated clockwise, the armature 28 will follow in the counterclockwise direction. That is, the magnetic orientation of the drive rotor permanent magnets with respect to the magnetic orientation of the armature permanent magnets is effective to drive the armature 28 in a direction opposite to the rotational direction of the drive rotor magnets. The speed of armature 28 is directly dependent upon the speed of the drive rotor magnets and stays in full synchronization unless shaft 27 is overloaded.

In the embodiment as shown in FIG. 5, the magnet orientation incorporates 7 permanent magnets in each circumferential section instead of five permanent magnets as in the magnet orientation of FIG. 2. This, of course, necessitates the use of six drive rotor magnets associated with this circumferential section. That is, one less drive rotor magnet than the number of armature permanent magnets is associated with each circumferential section. As stated hereinabove, the circumferential sections of this embodiment of magnet orientation represents a quadrant.

Referring to FIG. 6, instead of four circumferential sections, the armature is divided into six circumferential sections 91, 92, 93, 94, 95, and 96. Each of the six circumferential sections has five permanent magnets carried by the armature 81 and four drive rotor magnets associated with each circumferential section. Again, the magnet orientation between adjacent circumferential sections automatically reverses itself with the result that each section exerts the same amount of torque on armature 81.

As is evident herein, there is actually no theoretical limit to the number of circumferential sections or magnets utilized in a given embodiment. The only real limitations are associated with the size and mechanical complexity of the various parts as they relate to each other.

While the magnetic turbine has been shown and described in detail, it is obvious that this invention is not to be considered as being limited to the exact form disclosed, and that changes in detail and construction may be made therein within the scope of the invention, without departing from the spirit thereof.

I claim:
1. A magnetic transmission comprising:
   a. an output shaft,
   b. a free-rotating armature carried by said output shaft,
   c. a plurality of permanent magnets carried by said armature,
   d. said permanent magnets being magnetically oriented with each adjacent magnet having opposite magnetic polarities,
   e. a plurality of drive rotor permanent magnets rotatably mounted on an axis,
   f. each drive rotor axis having a fixed radial position with respect to the axis of said output shaft and disposed in magnetic proximity with said permanent magnets carried by said armature, and
   g. an input drive means coupled to said drive rotor permanent magnets for rotating said drive rotor permanent magnets in a synchronous relationship,
   h. said drive rotor permanent magnets being magnetically oriented for rotating said armature at a speed proportional to the rotating speed of said drive rotor permanent magnets,
   i. said permanent magnets carried by said armature and said drive rotor permanent magnets being disposed in discreet sectors in 360°,
   j. the permanent magnets carried by said armature having an odd number in each sector and said drive rotor magnets having one less than said odd number in each sector.
2. A magnetic transmission comprising:
   a. an armature mounted to rotate about an axis of rotation,
   b. each of a plurality of permanent magnets carried by said armature being magnetically oriented with each adjacent magnet having opposite magnetic polarities and being isolated with respect to each other by non-magnetic material,
   c. each of a plurality of drive rotor permanent magnets being rotatably mounted at a fixed radial posi- tion with respect to the armature axis of rotation and being disposed in magnetic proximity with respect to the permanent magnets carried by the armature, d. an input drive means coupled to the drive rotor permanent magnets for driving all of the drive rotor permanent magnets at a common speed and in a common direction, e. the magnetic polarity of said drive rotor permanent magnets with respect to the magnetic polarity of the armature permanent magnets is effective to rotate said armature at a speed proportional to the rotating speed of said drive rotor permanent magnets and in a direction opposite to the direction of rotation of all the drive rotor magnets.

3. A magnetic transmission as defined in claim 2 wherein
said armature is composed of a non-magnetic material and
the plurality of permanent magnets carried by the armature is disposed in discreet sectors around the entire periphery of the armature.

4. A magnetic transmission as defined in claim 3 wherein
said armature permanent magnets are disposed along the outside periphery of the armature and
said drive rotor permanent magnets are located at a fixed radial position along the outer circumference of the armature.

5. A magnetic transmission as defined in claim 2 wherein
the armature is fixedly mounted to an output shaft having its longitudinal axis coincidental to the axis of rotation for the armature.

6. A magnetic transmission as defined in claim 2 wherein
said driving means includes a motor and a gear mechanism for rotating the drive rotor magnets,
said gear mechanism including a bull gear which rotates the rotor magnets in common.

7. A magnetic transmission comprising:

a. an armature mounted to rotate about an axis of rotation, b. each of a plurality of permanent magnets carried by said armature being magnetically oriented with each adjacent magnet having opposite magnetic polarities, c. each of a plurality of drive rotor permanent magnets being rotatably mounted at a fixed radial position with respect to the armature axis of rotation and being disposed in magnetic proximity with respect to the permanent magnets carried by the armature, d. the armature permanent magnets and the drive rotor permanent magnets being located in discreet sections around the entire circumference of the armature, e. each circumferential section including an odd number of armature permanent magnets and an even number of drive rotor magnets equal to one less than the odd number of armature permanent magnets in each circumferential section, and f. means for driving all of the drive rotor permanent magnets at a common speed and in a common direction, g. said drive rotor permanent magnets being magnetically oriented for rotating said armature at a speed proportional to the rotating speed of said drive rotor permanent magnets.

8. A magnetic transmission comprising:

a. an armature mounted to rotate about an axis of rotation, b. each of a plurality of permanent magnets carried by said armature being magnetically oriented with each adjacent magnet having opposite magnetic polarities, c. each of a plurality of drive rotor permanent magnets being rotatably mounted at a fixed radial position with respect to the armature axis of rotation and being disposed in magnetic proximity with respect to the permanent magnets carried by the armature, d. the armature permanent magnets and the drive rotor permanent magnets being located in discreet sections around the entire circumference of the armature, e. each circumferential section including an odd number of armature permanent magnets and an even number of drive rotor magnets equal to one less than the odd number of armature permanent magnets in each circumferential section, and f. input drive means for driving all of the drive rotor permanent magnets.

* * * * *